United States Patent
Bastin et al.

(10) Patent No.: US 9,661,801 B2
(45) Date of Patent: *May 30, 2017

(54) TURN-COMPENSATING AGRICULTURAL MATERIAL SPREADER SYSTEM

(71) Applicant: CNH Industrial America LLC, New Holland, PA (US)

(72) Inventors: Bruce Bastin, Pennock, MN (US); Jon Ellingson, Benson, MN (US); Dane Kallevig, Willmar, MN (US); Kevin Lent, Glenwood, MN (US)

(73) Assignee: CNH Industrial America LLC, New Holland, PA (US)

( * ) Notice: Subject to any disclaimer, the term of this patent is extended or adjusted under 35 U.S.C. 154(b) by 171 days.

This patent is subject to a terminal disclaimer.

(21) Appl. No.: 14/530,314

(22) Filed: Oct. 31, 2014

(65) Prior Publication Data

US 2016/0120116 A1 May 5, 2016

(51) Int. Cl.
*A01C 17/00* (2006.01)
*B05B 12/08* (2006.01)
(Continued)

(52) U.S. Cl.
CPC .......... *A01C 17/006* (2013.01); *A01C 17/008* (2013.01); *B05B 12/08* (2013.01);
(Continued)

(58) Field of Classification Search
CPC ... A01C 17/001; A01C 17/008; A01C 17/006; A01C 17/003; A01C 21/00; B05B 12/08; G05B 15/02
(Continued)

(56) References Cited

U.S. PATENT DOCUMENTS 2,697,609 A * 12/1954 Chase ..................... B60B 39/06
239/657
4,405,089 A    9/1983 Taylor
(Continued)

FOREIGN PATENT DOCUMENTS

EP    0322046    6/1989
EP    0472855    3/1992
(Continued)

OTHER PUBLICATIONS

Ag_Tech; Straightening Out Those Turns; See p. 14: Nov. 1, 2012—(16 pages).
(Continued)

*Primary Examiner* — John G Weiss
(74) *Attorney, Agent, or Firm* — Rebecca L. Henkel; Rickard K. DeMille (57) ABSTRACT

A system and method of automatically adjusting an amount of agricultural granular material delivered to a field in response to vehicle steering activities. The system includes a sensor that is associated with a steering system of a vehicle configured to apply the material to a field. The sensor is connected to a controller that is configured to determine a deviation value associated with discrete turning activities. The controller is configured to manipulate operation of a first commodity delivery system and a second commodity delivery system such that different amounts of the agricultural material can be delivered to alternate lateral sides of the vehicle in response to turning activities.

15 Claims, 5 Drawing Sheets

(51) Int. Cl.
  *E01C 19/20* (2006.01)
  *A01C 15/00* (2006.01)
  *A01C 15/18* (2006.01)
  *B05B 7/14* (2006.01)
  *B05B 13/00* (2006.01)

(52) U.S. Cl.
  CPC .......... *E01C 19/203* (2013.01); *A01C 15/005* (2013.01); *A01C 15/18* (2013.01); *A01C 17/001* (2013.01); *B05B 7/144* (2013.01); *B05B 13/005* (2013.01)

(58) Field of Classification Search
  USPC ........................... 111/11, 130; 701/50; 239/7
  See application file for complete search history.

(56) References Cited

U.S. PATENT DOCUMENTS

| | | | |
|---|---|---|---|
| 6,012,656 A | 1/2000 | Anderson | |
| 6,027,053 A * | 2/2000 | Anderson | A01C 17/008 239/681 |
| 6,109,384 A | 8/2000 | Bromley et al. | |
| 6,517,281 B1 * | 2/2003 | Rissi | E01C 19/203 239/659 |
| 6,786,435 B2 | 9/2004 | Mishra | |
| 6,817,551 B2 | 11/2004 | Williams et al. | |
| 6,905,077 B2 * | 6/2005 | Hoyle | A01C 15/124 239/1 |
| 8,010,262 B2 * | 8/2011 | Schroeder | A01D 41/1243 701/50 |
| 8,777,707 B2 * | 7/2014 | Hoyle | A01B 79/005 460/111 |
| 2011/0015832 A1 | 1/2011 | Hoyle | |
| 2013/0054074 A1 | 2/2013 | Schreiber | |
| 2013/0105591 A1 * | 5/2013 | Peterson | A01B 79/005 239/1 |
| 2015/0351321 A1 * | 12/2015 | Shane | A01D 41/1243 460/1 |

FOREIGN PATENT DOCUMENTS

| | | |
|---|---|---|
| EP | 0797082 | 9/1997 |
| EP | 1869962 | 12/2007 |
| WO | 9403041 | 2/1994 |
| WO | 9524823 | 9/1995 |

OTHER PUBLICATIONS

Deer Manual: John Deere 4900 Multapplier; Jan. 1, 2009; from the internet at: http://www.highwayequipment.com/media/products/JDL3030G4_305250F_122012_FDDC06C4A250A.pdf—(1 page).

PinPoint; PinPoint lives up to its name: See p. 21; Mar. 11, 2013—(48 pages).

* cited by examiner

TURN-COMPENSATING AGRICULTURAL MATERIAL SPREADER SYSTEM

FIELD OF THE INVENTION

The invention relates generally to agricultural machines configured to disperse a granular commodity and, in particular, to a high-crop clearance machine having more than one distribution system associated with the commodity wherein operation of the discrete distribution systems can be automatically adjusted in response to vehicle turning activities.

BACKGROUND OF THE INVENTION

During production of agricultural crop products, whether the crop is intended as animal feed materials or vegetation destined for human consumption and once the soil has been prepared, it is necessary to disperse seed, fertilizer, and/or vegetation or pest treatment materials in a manner intended to maximize the product yield and use of treatment products associated with the area available. A consistent and uniform application of seed and treatment materials increases the potential of generating the desired yield and crop quality. During growth cycles it is also periodically desired or even necessary, to treat a field that includes established vegetation with supplemental agricultural materials such as insecticides, fertilizers, pesticides, and/or supplemental seeding to address washout or crop damage due to adverse weather conditions, pests, or the like.

Although the initial treatment and planting processes can be undertaken by virtually any implement or machine that is constructed to traverse a field, special care must be exercised during the application of treatments applied to those fields associated with an established crop so as to not unduly interfere, stunt, or possibly destroy the established crop materials. Such considerations resulted in the development of high-clearance crop vehicles or agricultural vehicles configured to traverse establish crop materials without unduly interfering with the established crops. Many such vehicles are provided as towable or self-powered vehicles that include elevated power and drivetrain systems such that the majority of the vehicle can traverse established crops without interfering or damaging the established crop materials.

Many such high-clearance vehicles include one or more extendable booms that are configured to spray liquid treatment materials to established crops. Such machines, whether towed or self-powered, commonly include a tank or reservoir supported by the chassis of the underlying vehicle and a pump system configured to communicate the liquid treatment materials to the respective booms. Although such machines have proved adequate for application of liquid crop treatment materials, such machines are ill-configured for applying granular agricultural products to fields that contain established crops. It is periodically desirable to disperse granular agricultural products, whether for supplemental seeding processes, fertilizing activities, insecticide, pesticide, and/or herbicide products in granular form to achieve the benefits of delayed time release, extended treatment periods, etc., that can be better achieved with granular treatment materials than liquid treatment materials. A need therefore exists for a system and method of dispensing granular commodities over areas associated with a previously established crop.

Another concern to desired crop growth and development, and a concern that is not unique to virgin soil or established crop applications, is the concern for generally uniform application or dispersal of seeding and/or treatment materials. Non-uniform seeding practices can result in undesirable crop densities and non-uniform application of treatment materials can result in damage to the crop by over concentration of treatment materials or less than desired treatment of the established crops. Both such incidence can increase operating costs due to reduced product yields and/or inefficient usage of the treatment materials. Turning activities can exacerbate the concerns associated with undesired over-concentration or under application of treatment and/or seed materials.

Those skilled in the art appreciate that, absent manipulation of respective material distribution rates, those areas located radially inward relative to a turn direction are subject to more concentrated application levels than those areas that are located radially outward relative to the turn direction during turning activities. During seeding activities, such discrepancies become evident as crop densities vary sequentially from highly populated areas to less populated areas associated with turning activities. Many operators, in an attempt to mitigate such variations, undertake seeding activities in as many straight line application directions as a given field will accommodate.

Unfortunately, such processes are somewhat inefficient. That is, many operators repeatedly start and stop seeding and/or treatment application processes during turning activities to achieve as many straight row seeding configurations as a field will accommodate in an effort to achieve a more uniform treatment concentration. Suspending treatment processes during turning activities consumes greater fuel and increases the operating time associated with generating a desired uniform material treatment for each particular field. A need therefore exists for a granular commodity dispersal system and method of dispersing granular commodity that can manipulate the amount of commodity delivered in the respective right hand and left hand lateral sides of a vehicle to provide more uniform material concentrations to the radially inside and radially outside lateral sides of a vehicle during turning activities.

SUMMARY OF THE INVENTION

The present invention is directed to a system and method for distributing a granular agricultural commodity that overcomes one or more of the drawbacks discussed above. One aspect of the invention discloses a system and method of automatically adjusting an amount of agricultural granular material delivered to a field in response to vehicle steering activities. The system includes a sensor that is associated with a steering system of a vehicle configured to apply the material to a field. The sensor is connected to a controller that is configured to determine a deviation value associated with discrete turning activities. The controller is configured to manipulate operation of a first commodity delivery system and a second commodity delivery system such that different amounts of the agricultural material can be delivered to alternate lateral sides of the vehicle in response to turning activities.

Another aspect of the invention that is usable or combinable with one or more of the above features or aspects discloses a system for automatically manipulating application distribution of agricultural materials. The system includes a sensor that is associated with a steering system of a vehicle configured to apply a commodity to a field and a controller that is in communication with the sensor. The controller is configured to receive a signal from the sensor and determine a deviation value associated with a difference between a turning direction of travel and a straight direction of travel associated with operation of the vehicle. The controller is configured to communicate with a first commodity delivery system that extends longitudinally along a first lateral side of the vehicle and a second commodity delivery system that extends longitudinally along a second lateral side of the vehicle. Each of the first and second commodity delivery systems are in configured to receive material from a common commodity container and are supported by the vehicle. The controller is further configured to manipulate operation of the first commodity delivery system and the second commodity delivery system to deliver different amounts of the commodity to the field via the first commodity delivery system and the second commodity delivery system if the deviation value exceeds a threshold.

Another aspect of the invention that is usable or combinable with one or more of the above features or aspects discloses a turn compensating agricultural commodity distribution system. The system includes an angle sensor that is associated with a wheel assembly that is turnable relative to a chassis of a vehicle configured to apply an agricultural commodity to a field. A controller is connected to the angle sensor and configured to manipulate a volume of the agricultural commodity delivered to a distribution system if a value received from the angle sensor exceeds a threshold associated with a deviation of the wheel assembly from a straight direction of travel of the vehicle.

A further aspect of the invention that is usable or combinable with one or more of the above features or aspects discloses a method of controlling application of an agricultural material to a field. The method includes sensing a position of a turnable wheel of an agricultural application vehicle. A degree of deviation of the turnable wheel from a straight travel direction position is determined and an amount of an agricultural material delivered to at least one of at least two distribution systems is automatically manipulated in response to the determined degree of deviation of the turnable wheel.

These and other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
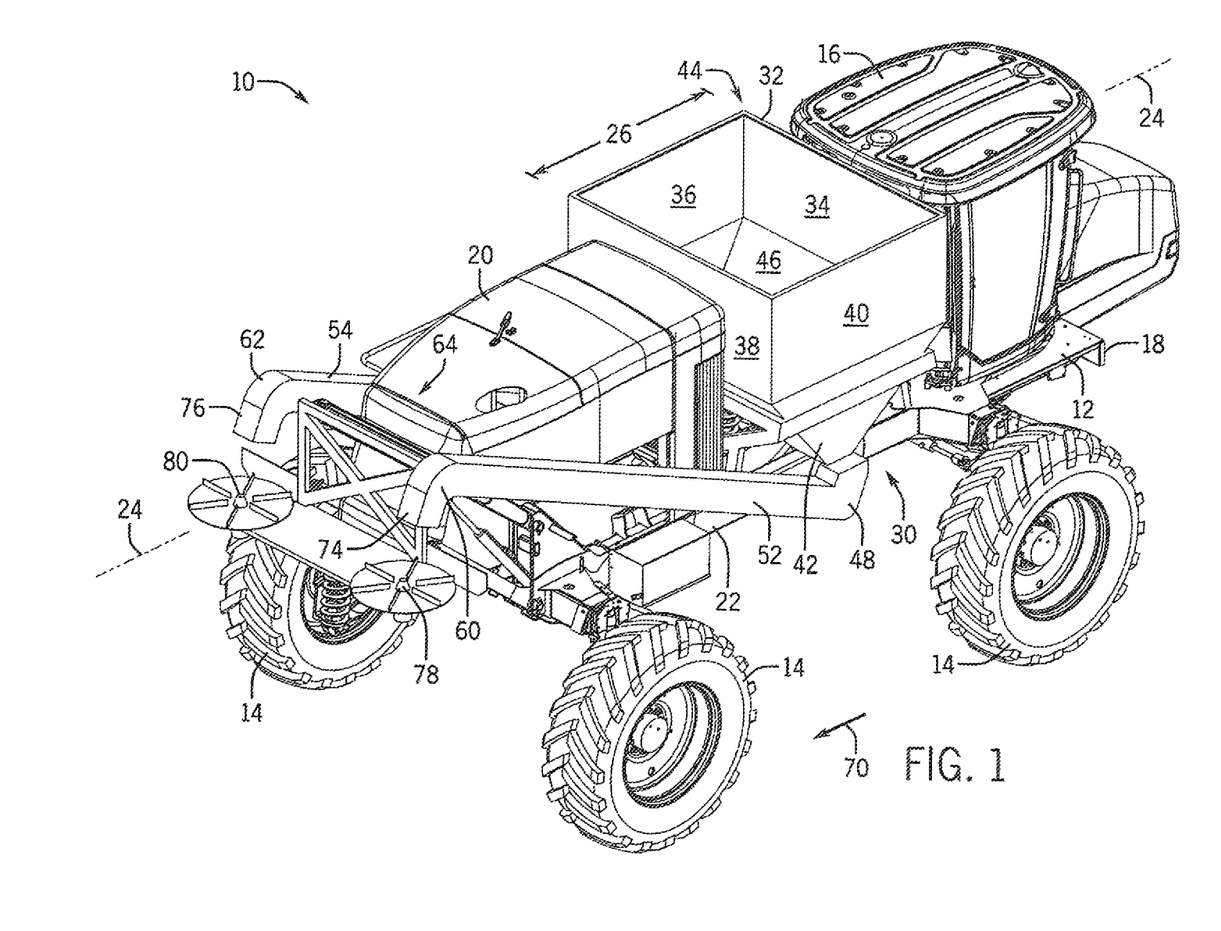
FIG. 1 a rear isometric view of a high-clearance crop vehicle equipped with an agricultural granular material dispersing system according to the present invention.

Referring now to the drawings and specifically to FIG. 1, aspects of the present invention will now be described by way of an exemplar environment of a self-propelled agricultural product application vehicle 10, which may be a high-clearance crop vehicle, in accordance and useable with one or more of the aspects and embodiments of the present invention. As used herein, the term "high-clearance" means a vehicle that is configured to traverse establish crops, particularly more vertically oriented crops such as corn, etc., with negligible interaction between the established crop and the chassis, frame members such as axles, and wheels of the underlying vehicle. Such vehicles provide a vertical cross-sectional shape wherein the vehicle can traverse established vegetation, such as corn of other premature crop materials as well as vegetables or other mature and premature lower growing crops, without interfering with or destroying the desired structures of the plant or crop.

Although some crop materials can tolerate limited interaction with a passing vehicle, the high-clearance vehicle is constructed to allow passage of the vehicle over most established vegetation without adversely impacting the health or productivity of the vegetation. It is appreciated that many agricultural vehicles that are not provided in a high-clearance configuration provide adequate clearance for immature and lower growing vegetation but that many such vehicles increase the potential of driving down established crops. Further, for established and more vertically oriented crop materials, such as corn or the like, use of more conventional clearance vehicles post only early crop growth stages, would interfere with the desired treatment of the established crop materials and risk unnecessary damage to the underlying crop materials.

Vehicle 10 includes a chassis or frame 12 having one or more tires or wheels 14 associated therewith. As disclosed further below, each of wheels 14 rotate about a respective generally horizontal axis and one or more of wheels 14 is turnable about a generally vertical axis to effectuate turning or changing the direction of travel of vehicle 10. It is appreciated that changes to the direction of travel of vehicle 10 can be effectuated in a number of manners including manually and/or automatically if vehicle 10 is equipped with such remote control or automatic operation methodologies.

Vehicle 10 includes an operator area or cab 16 that is associated with a forward portion 18 of a frame 12 and a power plant or engine 20 associated with the rearward portion 22 of frame 12. Cab 16 and engine 20 of vehicle 10 are offset from one another along a longitudinal axis 24 of vehicle 10 and associated with frame 12 to define a gap or a space, indicated by dimension 26, proximate a median or middle portion of vehicle 10. Vehicle 10 and space 26 are configured to accommodate association of a granular commodity container and application and/or delivery system 30 with vehicle 10. Preferably, delivery system 30 removably cooperates with vehicle 10 such that delivery system 30 can be remove from vehicle 10 and other treatment or harvest related devices, such as a liquid treatment application system, can be operatively associated with vehicle 10. Such a consideration increases the functionality associated with utilization of vehicle 10 and allows use of granular materials delivery system 30 as well as other treatment or harvest related devices with other vehicles or to be stored when not in use.

Delivery system 30 includes a container 32 defined by a number of walls 34, 36, 38, 40 that extend in an upward direction from a lower portion 42 of container 32 toward an upward facing opening 44. Container 32 is configured to receive granular commodities such as a seed product, a fertilizer product, a pesticide, a herbicide, an insecticide, etc., and/or mixtures thereof. Preferably, container 32 is configured to receive any solid granular commodity that may be desired to be applied to a crop area prior to or even after crop generation. The respective walls and portions of container 32 define a cavity or volume 46 of container 32 associated with containing a bulk volume of the respective granular commodity.

Figure 2:
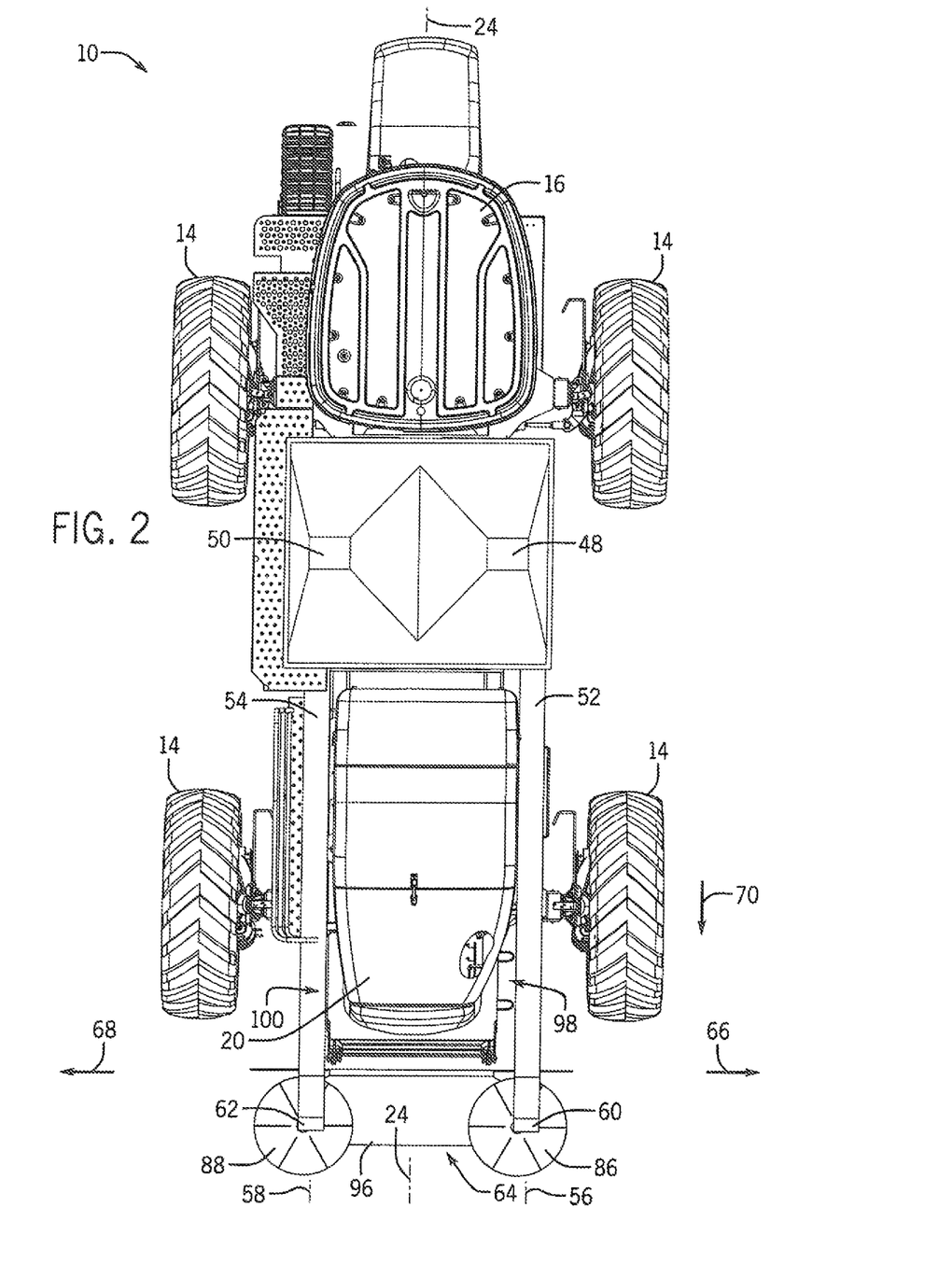
FIG. 2 is a top plan view of the vehicle shown in FIG. 1.

Lower portion 42 of container 32 is contoured to direct granular commodity associated with volume 46 toward a respective one of first end or intake end 48, 50 associated with a respective one of a first conveyor 52 and a second conveyor 54 associated with commodity delivery system 30. Each conveyor 52, 54 extends in a longitudinal direction, indicated by lines 56, 58 (FIG. 2) for conveying the granular commodity from container 32 toward a rear facing area of vehicle 10. As shown in FIG. 2, respective longitudinal axis 56, 58 associated with respective conveyors 52, 54, are contained within respective vertical planes that are generally aligned with longitudinal axis 24 of vehicle 10. Preferably, each axis 56, 58 includes vertical vector and a horizontal vector. Axis 56, 58 are preferably aligned with axis 24 in a longitudinal direction but can include a lateral vector such that conveyors 52, 54 are not perfectly aligned with axis 24 of vehicle 10 relative to the alternate lateral sides thereof. Preferably, conveyors 52, 54 do not interfere with frame 12 but are removable securable thereto and do not interfere with engine 20.

It is further appreciated that each of conveyors can be provided in a number of modalities including being defined as a respective one of a screw conveyor, a chain conveyor, a belt conveyor, etc. Regardless of the modality, each conveyor 52, 54 is configured to convey a granular commodity from container 32, along a respective outboard lateral side of engine 20, and toward a rearward portion of vehicle 10 during operation of a drive system associated with the respective conveyor.

Regardless of the modality, each conveyor 52, 54 includes a second or discharge end 60, 62 that is oriented rearward of the respective intake end 48, 50 associated with a respective conveyor 52, 54. Each discharge end 60, 62 is oriented to discharge granular commodity associated with the respective conveyor 52, 54 to a dispersal system or dispersal assembly 64 that is oriented proximate a rearward portion of vehicle 10. As disclosed further below, dispersal assembly 64 is configured to cooperate with discharge ends 60, 62 of respective conveyors 52, 54 to disperse the commodity communicated thereto to the areas generally rearward and laterally outboard, indicated by arrows 66, 68 of vehicle 10.

Referring to FIGS. 1 and 2, conveyors 52, 54 generally flank engine 20 and are inclined when considered in a rearward direction, indicated by arrow 70, from intake end 48, 50 toward discharge ends 60, 62 associated with the respective conveyors 52, 54. It should be appreciated that the degree of incline associated with conveyors 52, 54 can be fixed relative to vehicle 10 and/or adjustable relative thereto. A discharge chute 74, 76 is associated with a respective one of each of discharge ends 60, 62 of respective conveyors 52, 54 and disposed generally above a respective spinner assembly 78, 80 associated with dispersal assembly 64 such that commodity communicated with a respective one of conveyors 52, 54 is directed to interact with a respective one of spinner assemblies 78, 80 during application or spreading activities.

As is commonly understood, rotation of a disk 86, 88 associated with a respective spinner assembly 78, 80 effectuates a generally radial dispersion of granular commodity delivered to respective spinner assemblies 78, 80. It is further appreciated that spinner assemblies 78, 80 can include one or more shrouds oriented relative to a respective disk 86, 88 to generate the desired partially circumferential dispersion of the granular commodity delivered to respective spinner assemblies 78, 80 toward the rearward and laterally inboard and outboard locations relative to the orientation of the respective disk 86, 88 relative to the underlying vehicle 10. It is further appreciated that the rate of rotation of disks 86, 88 can be manipulated to generate the desired degree of dispersal of the granular commodity impinged upon the respective disk. As disclosed further below, it is further appreciated that the elevation of disks 86, 88 relative to the discharge ends 60, 62 of respective conveyors 52, 54 can be manipulated to also manipulate the dispersal performance associated with operation of disks 86, 88.

Figure 3:
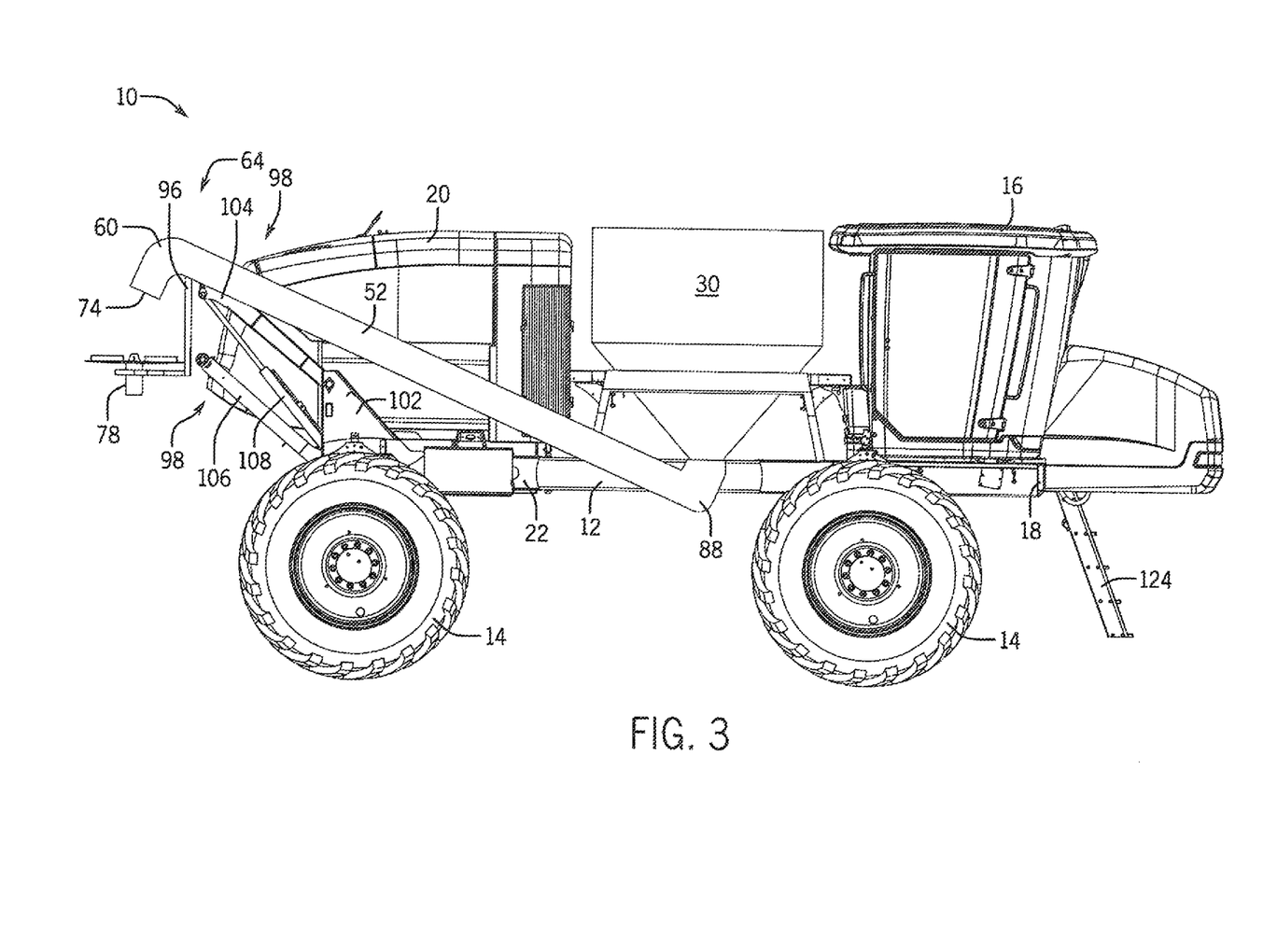
FIG. 3 is a side elevation view of the vehicle shown in FIG. 1.
Figure 4:
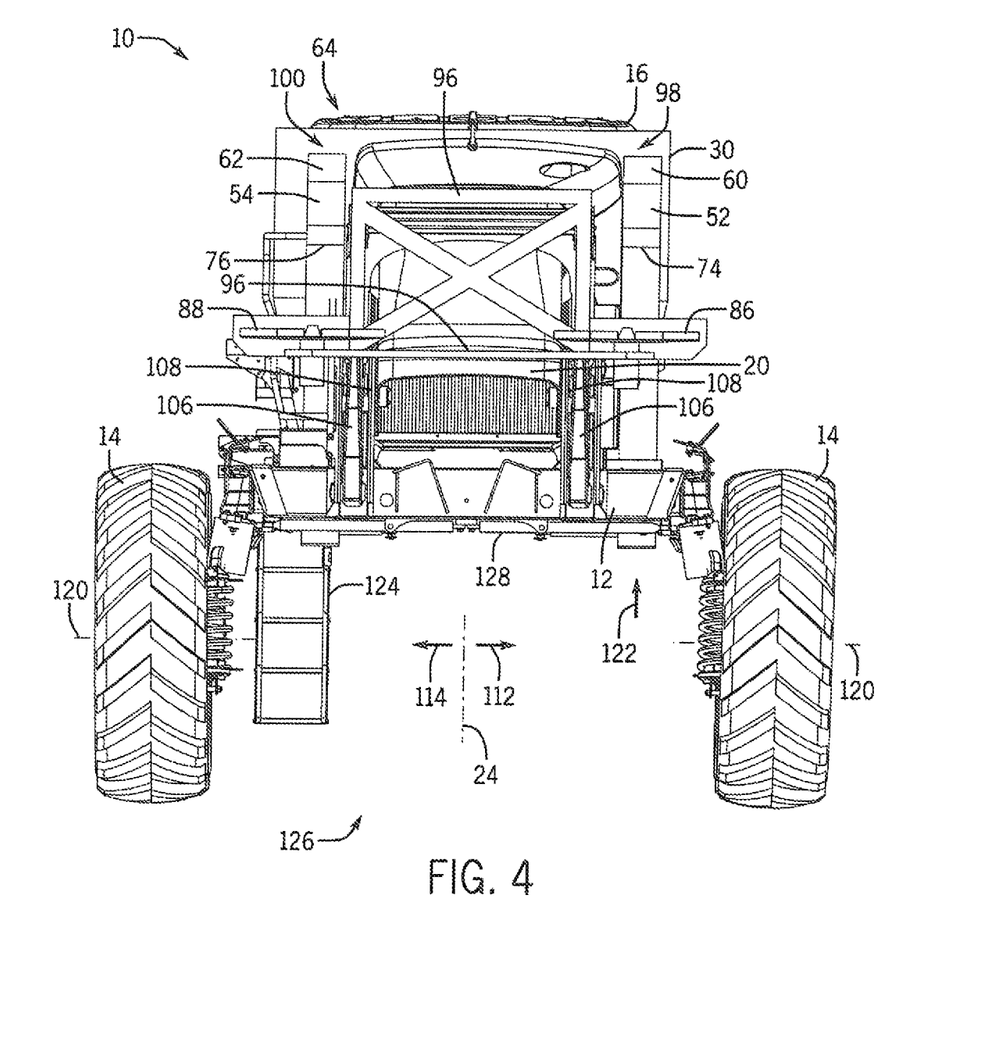
FIG. 4 is a rear elevation view of the vehicle shown in FIG. 1.

Referring to FIGS. 2-4, dispersal assembly 64 is supported by chassis or frame 12 by a mount arrangement or adjustment assembly that includes a carriage 96 having generally opposite ends that are supported by respective linkage assemblies 98, 100 that extend between frame 12 of vehicle 10 and carriage 96. Each linkage assembly 98, 100 includes a gusset 102 that is attached to a respective rearward portion 22 of frame 12 of vehicle 10. An upper link 104 and a lower link 106 extend between a respective bracket or gusset 102 and carriage 96. Respective gusset(s) 102, upper link(s) 104 and lower link(s) 106, and carriage 96 each form a parallel linkage wherein upper link(s) 104 and lower link(s) 106 rotate or form rotational links relative to a respective gusset(s) 102 and carriage 96. At least one variable length actuator 108 extends between at least one respective gusset 102 and carriage 96. Preferably, each linkage assembly 98, 100 includes an actuator 108 associated with the alternate lateral sides of vehicle 10 such that the alternate lateral sides of linkage assemblies 98, 100 are provided as mirror images of one another along centerline axis 24 of vehicle 10. Providing multiple actuators will reduce the incidents of binding associated with translation of dispersal assembly 64.

When provided as mirror images of one another, concurrently adjusting the length of respective actuators 108 rotates links 104, 106 relative to gusset 102 and manipulates the orientation of carriage 96 relative to discharge chutes 74, 76 of respective conveyors 52, 54 while maintaining alignment of spinner assemblies 78, 80 with a respective flow of granular commodity discharged from the corresponding respective conveyor 52, 54. As should be appreciated from FIG. 3, shortening respective actuator(s) 108 lowers carriage 96 and the respective spinner assemblies 78, 80 associated therewith relative to vehicle 10 and lengthening actuator(s) 108 raises carriage 96 relative thereto. Each linkage assembly 98, 100 is preferably provided as a four bar linkage such that carriage 96 is maintains a common rotational orientation throughout its range of motion. A pivotable connection is provided between each of links 104, 106 and actuator(s) 108 and the respective gusset 102 and carriage 96 such that spinner assemblies 78, 80 are maintained in a generally horizontal orientation throughout the range of motion of dispersal assembly 64 relative to vehicle 10.

Referring to FIG. 4, conveyors 52, 54 and spinner assemblies 86, 88 are each oriented on a respective generally opposite lateral side, indicated by arrows 112, 114, of a vertical plane associated with longitudinal axis 24 of vehicle 10. Granular material discharge from conveyor 52 is impinged upon disk 86 and granular material discharge from conveyor 54 is impinged upon disk 88 such that the granular material can be dispersed in a generally partially arcuate pattern from each respective spinner assembly 78, 80 in a generally rearward and outward lateral directions 112, 114 relative to the direction of travel of vehicle 10.

It should be appreciated that disk 86 associated with spinner assembly 78 can be configured to disperse granular material toward those areas generally more so toward direction 112 relative to axis 24 and disk. 88 associated with spinner assembly 80 can be configured to disperse granular material more so in direction 114 relative to axis 24. It is further appreciated that the operation spinner assemblies 78, 80 can be configured to cooperate with one another to provide an area of overlapping coverage proximate longitudinal axis 24. Such consideration provides a generally uniform application of granular materials to those areas immediately rearward of vehicle 10 as well as a portion of the areas that are lateral outboard of the respective wheels 14.

Still referring to FIG. 4, each of wheels 14 is associated with a respective horizontal axis of rotation 120 associated with the respective wheel 14. Frame 12 of vehicle 10 is offset in a generally vertical direction, indicated by arrow 122, relative to the axis of rotation 120 associated with operation of wheels 14. A ladder 124 is supported by frame 12 and can preferably be raised relative thereto such that, as vehicle 10 traverses a field, an unobstructed a crop area 126 is generally defined between wheels 14 and an underside or ground facing surface 128 of the chassis or vehicle frame 12.

Crop area 126 is preferably configured to allow vehicle 10 to traverse established crops without interference and/or contact with established plant materials. Carriage 96 associated with dispersal assembly 64 is preferably positionally adjustable so as to not interfere with crop 126. It is further appreciated that dispersal assembly 64 could be configured to extend below surface 128 frame 12 of vehicle 10 and thereby into crop area 126 for those applications where such an orientation maintains separation between carriage 96, spinner assemblies 78, 80 and any previously established vegetation. Understandably, such an orientation is more applicable to lower growing vegetation, such as beans, oats, wheat, cabbage, etc. as compared to more vertically oriented vegetation, such as corn.

It is further appreciated that for more vertically oriented vegetation, such as corn, such vegetation can withstand incidental contact with the underside 128 of frame 12 via deflection of the vegetation. The elevationally adjustable nature of dispersal assembly 64 allows treatment of more vertical established crops wherein the established crops do not unduly interfere with the dispersal activities by blocking or otherwise impeding dispersal of the granular commodity in directions away from vehicle 10.

Regardless of the vegetation, and/or the relative orientation of carriage 96 relative to discharge chutes 74, 76 of a respective conveyor 52, 54, vehicle 10 is configured to communicate and disperse granular materials in a generally uniform manner to fields or growing areas populated with previously established plant matter without unduly interfering with the established plant matter. Preferably, wheels 14 are shaped to traverse the growing area in spaces between adjacent crop rows such that frame 12, carriage 96, and wheels 14 do not adversely affect the established crop materials and the established crop materials do not adversely interfere with the dispersal of the granular commodity.

It is appreciated that operation of the heretofore description of the granular commodity delivery system such as conveyors 52, 54 and dispersal assembly 64 can be adequately manually managed by an operator associated with cab 16. It is further appreciated that such operators are commonly intuitively aware of dispersal or application rates such that such operators can generate a desired application concentration under various conditions and can commonly adjust operation of the respective delivery and dispersal systems on-the-fly to maintain a desired application concentration during changes to the application conditions and/or vehicle operation. FIG. 5 refers to a further aspect of the present invention that improves the performance of the application process to generate a more repeatable material application in response to deviations in the application process.

FIG. 5 is a schematic representation of a control system 150 that is configured to automatically control operation of one or more of conveyors 52, 52, the position associated with dispersal assembly 64, and/or operation of spinner assemblies 78, 80 to achieve a desired dispersal of the granular commodity supported by vehicle 10. System 150 includes one or more sensors 152 that are associated with a steering system 154 of the underlying vehicle 10. Although sensor 152 is shown as being disposed proximate a turnable or steerable wheel 14 of vehicle 10, it is appreciated that sensor 152 could be configured or otherwise positioned anywhere within the electrical, mechanical, electro-mechanical, hydraulic, hydro-electric, and/or hydro-mechanical systems associated with communicating a turning instruction from a steering control, such as a steering wheel, to a steerable wheel associated with changing the direction of movement of vehicle 10 relative to a field. It is further appreciated that sensor 152 could be configured to detect changes in a travel direction associated with other vehicle drive systems such as track driven vehicles for example.

Regardless of the operational methodology associated with sensor 152, sensor 152 communicates a signal indicative of a vehicle turning activity to a controller 156. Controller 156 is configured to determine a deviation value associated with a vehicle turning activity. As used herein, turn or steering deviation values are indicative of deviations of one or more steerable wheels of vehicle 10 relative to an orientation of the respective wheel and/or steering control associated with straight line travel of vehicle 10. Controller 156 is connected to a first commodity delivery system 157, such as conveyor 52, and the second commodity delivery system 159, such as conveyor 54, and is configured to independently manipulate operation of the respective conveyors 52, 54 in response to turning activities of vehicle 10.

During a left-hand turn process, as determined by an operator positioned in cab 16 and indicated by arrow 158, more commodity is communicated to a respective spinner assembly 80 via conveyor 54 than is communicated to the respective spinner assembly 78 associated with conveyor 52. Inverse respective volumes of granular commodity are communicated to conveyors 52, 54 during right-hand turn processes, indicated by arrow 160. Said in another way, during right-hand and left-hand turn processes, the area associated with the radially inward or radially inboard areas associated with a turn activity will be less than the area associated with the radially outward or radially outboard areas associated with the same turn activity and more granular commodity will be communicated via the delivery and/or broadcast system associated with radially outboard side of vehicle 10. It is further appreciated that manipulation of the volumes of granular commodity conveyed with the respective right and left hand oriented conveyors 52, 54 can be manipulated by manipulating the operational speed of the respective conveyors and/or manipulated by the volume of granular commodity delivered to the respective conveyors 52, 54, such as via a sluice gate or the like associated with container 32 and/or the intake end associated with the respective conveyor 52, 54.

Figure 5:
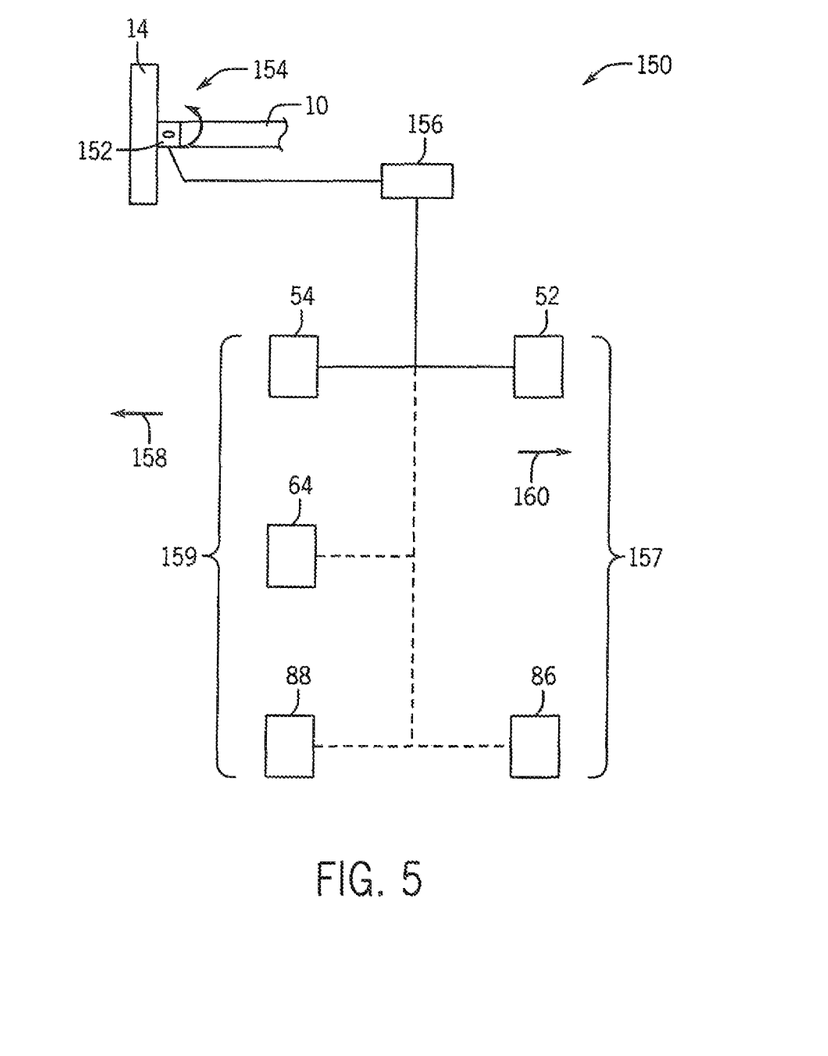
FIG. 5 is a graphical view of a turn compensation control system of the granular material dispersing system shown in FIG. 1.

Controlling operation of conveyors 52, 54 and/or the communication of granular commodity delivered thereto in a manner that is responsive to turning activities associated with movement of vehicle 10 allows a greater volume of commodity to be communicated to the larger areas associated the outboard turn side of vehicle 10 as compared to the smaller areas associated with the inboard turn side of vehicle 10. Such control improves the uniformity of the granular commodity dispersal during turning activities. Preferably, operation of conveyors 52, 54 is manipulated in such a manner so as to generate a generally uniform granular commodity application concentration to the radially inboard and radially outboard sides of vehicle 10 during respective turning activities. Alternatively, it is further envisioned the controller 156 can also be configured to automatically manipulate the elevation of dispersal assembly 64 relative to vehicle 10 and/or the operating speed of respective spinner assemblies 78, 80 to effectuate dissimilar commodity delivery rates and/or ranges of dispersion of the granular commodity in response to turning activities associated with operation of vehicle 10. Such a configuration allows alternate left and right hand side delivery systems 157, 159 to disperse different amounts of granular commodity to the alternate inboard and outboard sides of vehicle 10 during turning activities to generate a desired uniform application of the commodity associated with different coverage areas adjacent the respective alternate lateral sides of vehicle 10 during the dispersal activity.

The configuration of delivery system 30 for cooperation with a high-clearance crop vehicle allows vehicle 10 to be quickly and conveniently configured for dispersal of granular commodities and/or liquid treatment applications upon both bare fields as well as fields with previously established plant or crop vegetation. The laterally outboard orientation of conveyors 52, 54 and the elevational adjustment of dispersal assembly 64 allows vehicle 10 to generate a uniform granular commodity dispersal to the rearward and one or both of the lateral sides of vehicle 10 during application processes for both bare fields and fields populated with plant vegetation in a manner that is none detrimental to established crop materials. The selective operation of the alternate right and left hand side delivery systems further allows greater accommodation of requirements unique to a given field such as instances when dispersal to only a right hand side or a left hand side of vehicle 10 is desired. The communication of variable amounts of granular commodity to the alternate right hand side and left hand sides of vehicle and the automatic control of such dispersal activities provides a granular commodity delivery system that accommodates various application requirements and is convenient to operate thereby improving the efficiency of treatment practices as well as efficient utilization of granular treatment materials.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Many changes and modifications could be made to the invention without departing from the spirit thereof. The scope of these changes will become apparent from the appended claims.

We claim:

1. A system for automatically manipulating application distribution of agricultural materials, the system comprising:
   a sensor associated with a steering system of a vehicle configured to apply a commodity to a field;
   a controller configured to receive a signal from the sensor and determine a deviation value associated with a difference between a turning direction of travel and a straight direction of travel associated with operation of the vehicle;
   the controller being configured to communicate with a first commodity delivery system that extends longitudinally along a first lateral side of the vehicle and a second commodity delivery system that extends longitudinally along a second lateral side of the vehicle, each of the first and second commodity delivery systems being in communication with a common commodity container and supported by the vehicle; and
   the controller being configured to manipulate operation of the first commodity delivery system and the second commodity delivery system to deliver different amounts of the commodity to the field via the first commodity delivery system and the second commodity delivery system if the deviation value exceeds a threshold;
   wherein more commodity is delivered to a first spinner associated with a respective one of the first and second commodity delivery systems that is oriented toward an outside turn radius side of the vehicle than a second spinner that is associated with the commodity delivery system oriented toward an inside turn radius side of the vehicle.

2. The system of 1 wherein each of the first commodity delivery and the second commodity delivery system includes a conveyor that extends longitudinally along a respective lateral side of an engine disposed rearward of the container.

3. The system of claim 2 further comprising a mount arrangement that supports the first and the second spinners, the mount arrangement being connected to the controller such that the controller can manipulate a position of the first and second spinners relative to a discharge end of the conveyor of the respective one of the first and second commodity delivery systems.

4. The system of claim 3 wherein the mount arrangement further comprising a variable length actuator and the controller is configured to manipulate a length of the variable length actuator to manipulate the position of the first and second spinners.

5. The system of claim 1 wherein the commodity is further defined as at least one of a fertilizer material, a crop protection material, and a seed material.

6. A turn compensating agricultural commodity distribution system, the system comprising:
  an angle sensor associated with a wheel assembly that is turnable relative to a chassis of a vehicle configured to apply an agricultural commodity to a field; and
  a controller connected to the angle sensor and configured to manipulate a volume of the agricultural commodity delivered to a distribution system if a value received from the angle sensor exceeds a threshold associated with a deviation of the wheel assembly from a straight direction of travel of the vehicle;
wherein:
  the distribution system is further defined as a right side conveyor and a left side conveyor and each conveyor is associated with a spinner assembly;
  an adjustment assembly is disposed between the spinner assembly and the chassis that concurrently adjusts a position of a first spinner and a second spinner relative to the right side conveyor and the right side conveyor; and
  an engine disposed between the right side conveyor and the left side conveyor, rearward of a container associated with the agricultural commodity, and forward of the spinner assembly.

7. The system of claim 6 wherein the controller is configured to manipulate a rate of operation of the right side conveyor and the left side conveyor such to deliver more of the agricultural commodity to the respective conveyor associated with an outside turn radius side of the vehicle than the respective conveyor associated with in inside turn radius side of the vehicle.

8. The system of claim 6 wherein the rate is variable as a function of a turning radius.

9. The system of claim 6 wherein the vehicle is further defined as a high-clearance crop vehicle.

10. The system of claim 6 wherein the agricultural commodity is further defined as at least one of a seed product, a fertilizer product, and a crop protection product.

11. A method of controlling application of an agricultural material to a field, the method comprising:
  sensing a position of a turnable wheel of an agricultural application vehicle;
  determining a degree of deviation of the turnable wheel from a straight travel direction position; and
  automatically manipulating an amount of an agricultural material delivered to at least one of at least two distribution systems in response to the determined degree of deviation of the turnable wheel such that a agricultural material is delivered to a first spinner associated with the at least one of the at least two distribution systems oriented toward an outside turn radius side of the vehicle than a second spinner that is associated with at least a second one of the at least two distribution oriented toward an inside turn radius side of the vehicle.

12. The method of claim 11 wherein manipulating the amount of the agricultural material delivered further comprises adjusting an operating speed of a conveyor disposed between a container and a spinner such that more of the agricultural material is delivered to an outside turn side of agricultural application vehicle than an inside turn side of the agricultural application vehicle.

13. The method of claim 12 further comprising concurrently adjusting an elevation of the spinner and another spinner relative to a discharge end of a respective one of the conveyor and another conveyor.

14. The method of claim 11 further comprising associating a container configured to contain at least one of a seed product and a granular fertilizer product with the agricultural application vehicle such that the container is forward of an engine and associated with a pair of conveyors that extend longitudinally along the engine relative to a longitudinal axis of the agricultural application vehicle.

15. The method of claim 11 further comprising configuring the agricultural application vehicle and the at least two distribution systems to traverse an established crop.

* * * * *